M. HOWELL.
COFFEE POT.
APPLICATION FILED OCT. 9, 1912.
1,083,211.
Patented Dec. 30, 1913.
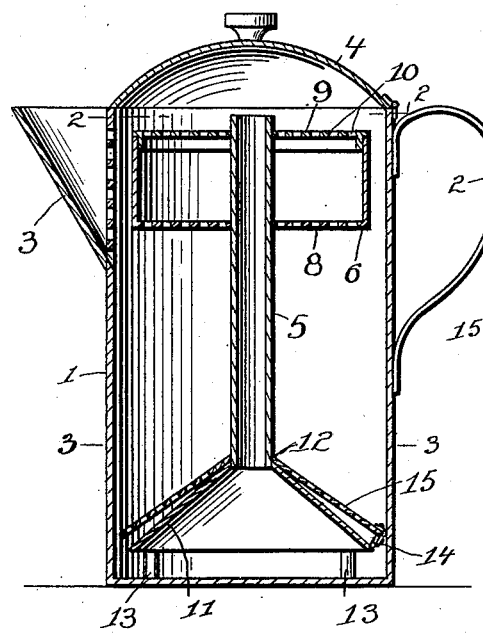
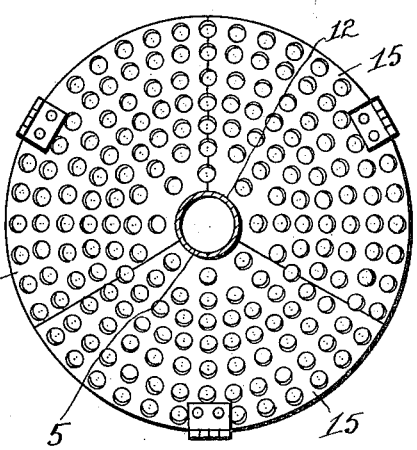
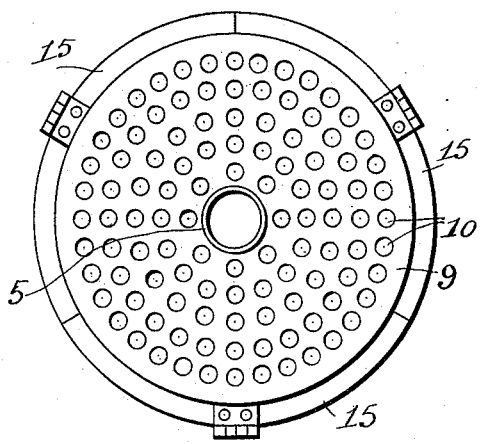
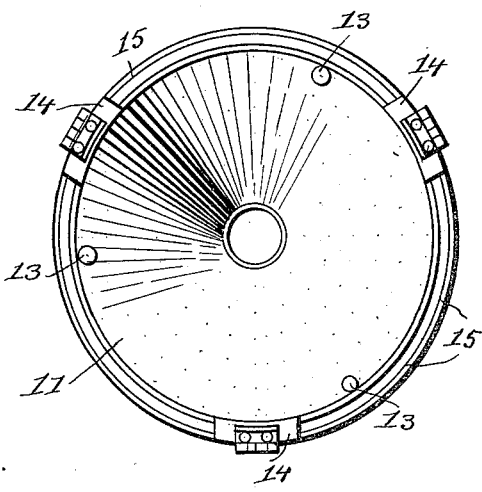
Inventor
M. Howell
Attorneys
Witnesses

UNITED STATES PATENT OFFICE.

MARY HOWELL, OF IONE, OREGON.

COFFEE-POT.

1,083,211.   Specification of Letters Patent.   Patented Dec. 30, 1913.

Application filed October 9, 1912. Serial No. 724,879.

*To all whom it may concern:*

Be it known that I, MARY HOWELL, a citizen of the United States, residing at Ione, in the county of Morrow, State of Oregon, have invented certain new and useful Improvements in Coffee-Pots; and I do hereby declare the following to be a full, clear, and exact description of the invention, such as will enable others skilled in the art to which it appertains to make and use the same.

This invention is directed to attachments for coffee pots, the same being so constructed that it may be placed within the pot to create a complete circulation of the liquid from the bottom to the top of the pot.

A further object of the invention is to construct a device of this character in a simple manner, the same being so arranged that the liquid during its circulation will percolate through the ground coffee to extract the essence therefrom, said circulation continuing until the coffee is of a desired strength.

With these and other objects in view, this invention resides in the novel features of construction, formation, combinations, and arrangements of parts to be hereinafter more fully claimed and illustrated in the accompanying drawing, in which:—

Figure 1 is a vertical sectional view through a coffee pot showing the attachment therein. Fig. 2 is a sectional view on line 2—2 of Fig 1. Fig. 3 is a similar view on line 3—3 of Fig. 1. Fig. 4 is a bottom plan view of the attachment.

Referring to the drawing, the numeral 1 designates the body of the coffee pot being provided with a handle 2, pouring spout 3, and hinged top 4, all of which are of the usual construction.

The attachment consists of a vertical tube 5, the upper end of which projects slightly above the upper edge of the annular coffee receiving receptacle 6, said receptacle having its bottom formed with perforations 8. A cover 9 is provided for the receptacle 6, said cover being also provided with perforations 10. The cover 9 when in place is slightly below the tube 5. Secured to the lower end of the tube 5 is a cone 11, the apex of which is formed with an opening 12 which has communication with the interior of the tube 5. To the lower edge of the cone 11 is secured a plurality of legs 13 which hold the lower edge of the cone spaced from the bottom of the pot. It will be noted that the greater diameter of the cone is of less diameter than the coffee pot. Secured to the lower edge of the cone 11 and directed outwardly therefrom at an inclination are ears 14 to which are hingedly connected the lower edges of the segmental shaped plates 15, the upper ends of which rest upon the upper end of the cone 11. The segmental plates 15 are perforated, and by having their lower ends connected to the ears 14 the same are held in spaced relation from the sides of the cone. By reason of these plates being of segmental form and hinged they may be readily lifted for the purpose of cleaning the under sides of the plates and the top of the cone. Furthermore, the perforations in these plates break up the downwardly moving current of liquid and insure a quiet movement and even operation of the device.

From this construction it will be seen that when the water in the pot begins to boil the same will during its circulation pass upwardly through the tube 5 and will percolate through the receptacle 6 and will then continue to circulate through the segmental plates 15 where it will be deflected by the sides of the cone 11 downwardly and against the interior surface of the pot, and from thence through the tube 5, this action being continued until the coffee is of a desired strength.

What is claimed is:—

1. The combination with a coffee pot, of a percolating attachment therefor comprising a tube, having a coffee receptacle secured near its upper end, said tube having its upper end projecting above the receptacle, a cone secured to the lower end of the tube and having communication therewith, said cone being provided with means whereby it is supported above the bottom of the pot, and perforated plates having their lower edges hinged to the lower edges of said cone, as and for the purpose set forth.

2. The combination with a coffee pot provided with a cover and a bottom, of a percolator attachment therefor consisting of a vertical tube having an annular coffee receptacle secured to its upper end, said tube having its upper end projected above the cover of said receptacle, the bottom and cover of the receptacle being perforated, a cone secured to the lower end of the tube and having communication therewith, legs secured to the lower end of the cone for supporting the same above the bottom of the pot, ears secured to the lower end of the cone, segmental shaped plates hingedly connected to said ears, said plates being perforated and spaced from the side of the cone, as and for the purpose set forth.

In testimony whereof, I affix my signature in presence of two witnesses.

MARY HOWELL.

Witnesses:
R. N. HYMER,
E. J. BRISTOW.

---

Copies of this patent may be obtained for five cents each, by addressing the "Commissioner of Patents, Washington, D. C."